United States Patent Office 2,988,280
Patented June 13, 1961

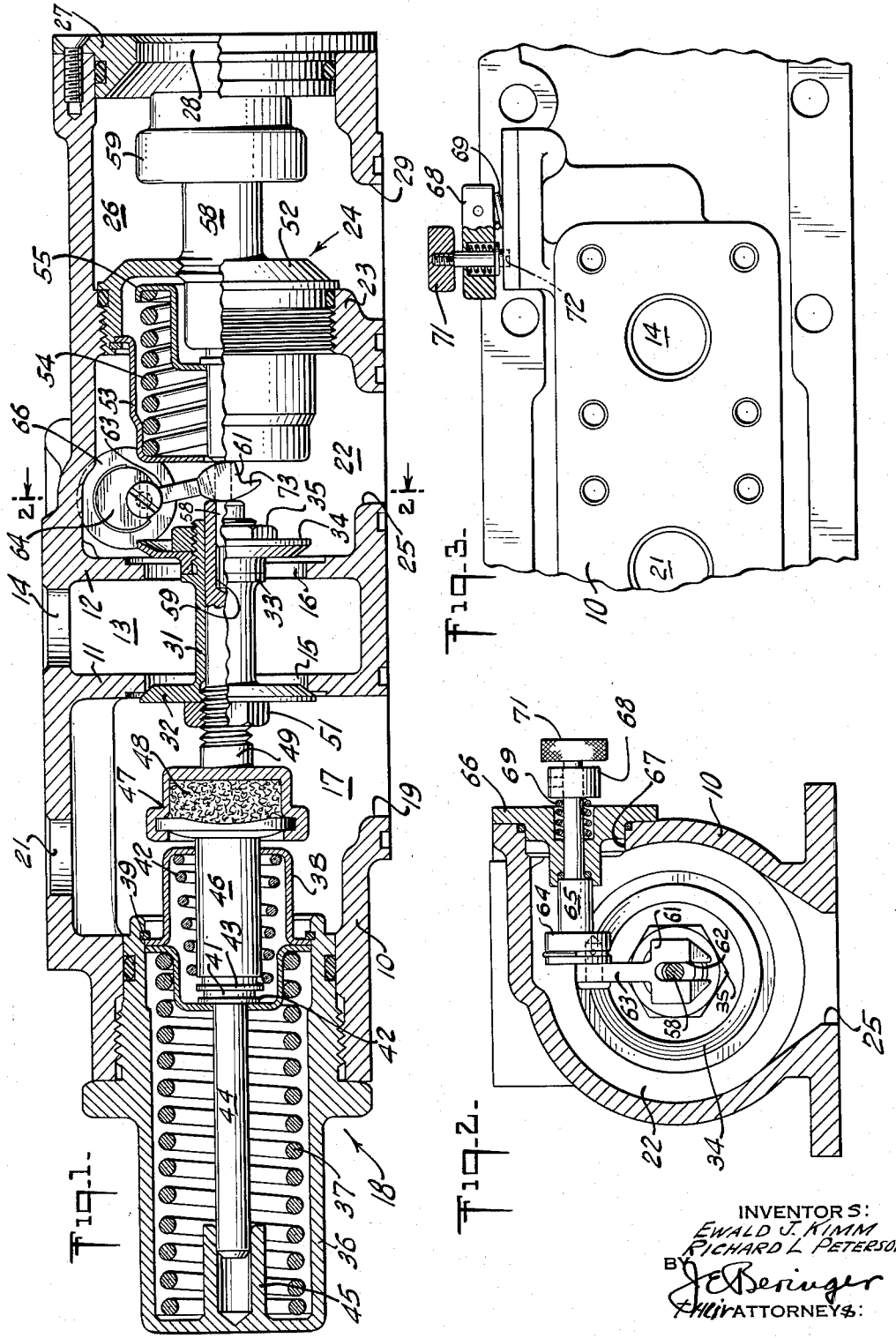

2,988,280
THERMOSTATIC VALVE
Ewald J. Kimm, Dayton, and Richard L. Peterson, West Carrollton, Ohio, assignors to United Aircraft Products, Inc., Dayton, Ohio, a corporation of Ohio
Filed Nov. 26, 1958, Ser. No. 776,573
3 Claims. (Cl. 236—34.5)

This invention relates to valves, and particularly to a thermostatic valve assembly interposed in the path of flow of two different fluids to control the flow of one of said fluids by reference to the temperature of both thereof. The invention has especial, although not limited, concern with engine accessories wherein flowing fuel and circulating lubricant are brought into heat exchange relation for cooling of the lubricant or heating of the fuel or both, in such devices the flow of the relatively hot lubricant to the heat transfer surface being controlled to achieve selected heat exchange results.

It is an object of the invention to provide a form of selective control in a valve assembly as described whereby the valve may be at times made non-responsive to the temperature of one of the flowing fluids.

Another object of the invention is to provide a simple means, accessible from outside the valve body to make the valve selectively responsive to one of the flowing fluids.

A further object of the invention, in a valve assembly of specific application to a system cooling lubricant by a flowing fuel, to make the valve selectively responsive to the fuel temperature in accordance with the high and low temperature characteristics of the fuel.

Other objects and structural details of the invention will appear from the following description when read in connection with the accompanying drawing, wherein:

FIG. 1 is a view in longitudinal section of a thermostatic valve assembly in accordance with the illustrated embodiment of the invention;

FIG. 2 is a view in cross-section, taken substantially along the line 2—2 of FIG. 1; and FIG. 3 is a fragmentary view of the exterior of the valve body, showing the manipulative control for the thermostatic means partly broken away.

Referring to the drawing, the invention in its illustrative embodiment takes the form of a valve assembly used in connection with a suitable heat exchanger to obtain a cooling of lubricating oil which has been heated by passage through the engine, the coolant used being flowing liquid fuel. The valve and heat exchanger combination functions by directing the heated lubricating oil to the heat exchanger where it is brought into heat transfer relation to the relatively cooler fuel. A portion of the heat thus is extracted from the oil which accordingly is returned to the engine for reuse in a better condition for lubrication. According to a feature of the valve operation, when the oil is not in need of cooling it is routed directly to the engine in by-passing relation to the heat exchanger. Similarly, and in accordance with a particular feature of the present invention, selectively operable means effect by-passing flow of the oil irrespective of the temperature of the latter when the fuel temperature reaches a predetermined high value indicating overheating.

The valve assembly comprises an elongated, generally tubular body 10 having intermediate its ends a pair of vertical spaced apart partitions 11 and 12 which define between them a chamber 13 communicating through an opening 14 with the exterior of the body. The partition 11 is formed with a longitudinal through opening 14, and, in line therewith is a similar opening 16 in the partition 12. The opening 15 places the chamber 13 into communication with a thermostat chamber 17 defined by and between the partition 11 and one closed end of the body 10, such end being closed by installation of a thermostatic unit 18 therein. Chamber 17 communicates with the exterior of the valve body through a bottom opening 19 and an upper opening 21. Opening 16 places the chamber 13 in communication with a body chamber 22 defined by and between the partition 12 and a further intermediate partition 23 in which is installed a further thermostat assembly 24. The chamber 22 communicates with the exterior of the valve body through an opening 25. The partition 23 cooperates with the other end of the valve body in defining a further thermostat chamber 26, such end of the body being closed by an inserted member 27 having an opening 28 therein communicating the chamber 26 with the exterior of the valve body through the end of such body. The chamber 26 additionally communicates with the exterior of the valve body through a lower opening 29 therein.

In the use of the valve unit in an illustrative embodiment as described, the body opening 14 receives heated or uncooled lubricating oil and admits it to chamber 13 which thus serves as an oil inlet chamber. The outlets 15 and 16 from the chamber 13 are valve controlled, as will hereinafter more clearly appear. The body port 25 communicates with the oil inlet side of the heat exchanger, while body opening 19 communicates with the oil outlet side of the heat exchanger. Body opening 21 is connected to the oil return line. Accordingly, flow out of the chamber 13 by way of opening 15 directs heated or uncooled oil directly into the chamber 17 where it passes out of the valve unit by way of opening 21 without having reached the heat exchanger. Flow out of the chamber 13 by way of opening 16 directs the heated or uncooled oil to the heat exchanger by way of opening 25. Passing through the heat exchanger, in heat transfer relation to the fuel, the oil has its temperature reduced and is returned from the heat exchanger to the valve unit through the body opening 19, and thence passes through the chamber 17 and out the opening 21.

The chamber 26 and openings 28 and 29 define a passage through the valve body for the fuel. Thus, the fuel is directed to outlet opening 29 after passage through the heat exchanger and is admitted to chamber 26 and immediately routed out of the valve body by way of opening 28.

A valve sub-assembly controlling flow out of the inlet chamber 13 comprises a tubular sleeve 31 on one end of which is a circular valve 32 located within the chamber 17 to move toward a seat in the opening 15 to close such opening. On the other end of the sleeve 31 are screw threads and a radial abutment 33 providing a mounting for another circular valve element 34 located within the chamber 22 to move toward a seat in opening 16 to close such opening. A nut 35 holds the valve element 34 on the sleeve 31. The sub-assembly comprising sleeve 31 and valve elements 32 and 34 accordingly is an integrated unit and it will be observed that the spacing between the circular valve elements is such that when one element is in a seated or closed position in its respective opening the other element stands spaced from or in an open position with respect to its opening. Thus, in the position of the parts illustrated the valve element 32 stands in a closed position in opening 15 while valve element 34 stands spaced from and in an open position with respect to opening 16. In this position of the parts, therefore, flow from the inlet chamber 13 is by way of opening 16 and by-passing flow by way of opening 15 is denied.

The thermostat assembly 18 is of a known, conventional kind. It comprises a housing 36 screwed into the end of the body 10 and containing a relatively strong pressure relief spring 37 bearing on a cage 38 and holding it normally to a seat on a ring 39 in the inner open end of the housing. Within the cage 38 is a plunger 41 having a shoulder 42 to bear upon the bottom of cage 38, and a compression spring 43 bearing upon the opposite end or top of the cage 38. An extension 44 of the plunger 41 extends through and beyond the cage 38 and has a sliding bearing in a boss 45 in the outer closed end of the housing 36. Also in the cage 38 and in surrounding relatively movable relation to the plunger 41 is a sleeve 46 having a shoulder 40 providing a seat for the spring 43. The sleeve 46 extends through and beyond the top of cage 38 and is rigidly connected to a case 47 containing a thermally sensitive material 48. In line with the sleeve 46 on the opposite side of the case 47 is a shaft 49 which is in coaxial alignment with the sleeve 31 of the valve sub-assembly. The shaft 49 is united with the valve sub-assembly by screw threaded engagement with one end thereof and through a nut 51 threaded on the shaft and jammed against the circular valve element 32. The shaft 49 is connected to the thermostat case 47 for unison movement therewith. The thermal material 48 has the characteristic of expansion with relatively great force under applied heat. This expansive force is applied upon the plunger 41 (in a manner not fully shown herein). This applied pressure attempts to extrude the plunger 41 outward relatively to the sleeve 46 but this motion is resisted by the cage 38 and relief spring 37. Accordingly, the expansive force is resolved into a reacting motion of the assembly comprising case 47, sleeve 46 and shaft 49 outwardly or to the right as viewed in the drawing. This motion serves to compress spring 43 within the cage 38, which spring accordingly provides a force for return of the parts in a retracting or leftward direction when a lowering temperature enables a contraction of the material 48.

The case 47 is located centrally of the chamber 17 in a position to be washed by oil flowing through the chamber to the outlet opening 21 whether coming from the by-pass opening 15 or from the heat exchanger by way of opening 19. The thermal material 48 thus is subject to the influence of the temperature both of uncooled, by-passing oil and of cooled oil and to a mixture of the two. Under the influence of temperature changes the thermostat assembly 18 operates in the manner described to effect adjustments in the valve sub-assembly whereby all of the oil flow is directed alternatively to the heat exchanger or in by-passing relation thereto, or a portion of the oil is directed to the heat exchanger and another portion in by-passing relation thereto, all as determined by the oil temperature as described.

The thermostatic assembly 24 similarly is generally conventional in nature. It comprises a housing 52 having a screw threaded mounting in the partition wall 23. An inner sleeve 53 extends inwardly from the housing 52 toward the partition wall 12 within chamber 22. A spring 54 is compressed between the sleeve 53 and a second inner concentric sleeve 55 which is in surrounding relation to a plunger 56 and limiting against a shoulder 57 thereon. The plunger 56 is slidably mounted in and extends from a relatively stationary cylinder 48 having a screw threaded mounting in the housing 52 and integrated to case 59 containing a thermally sensitive material (not shown) like the material 48. The cylinder 58 and its mounted case 59 project outwardly or rearwardly of the housing 52 into the chamber 26. The thermally sensitive material in the case 59 accordingly is influenced by the temperature of the fuel passing through the body by way of opening 29, chamber 26 and outlet opening 28. Expansion of the thermally sensitive material in the case 59 results in a relative extension of plunger 56 leftwardly as viewed in the drawing. This motion compresses the spring 54 which thus provides a force for return of the parts in response to a lowering fuel temperature.

The construction and arrangement of parts places the outer free end of the plunger 56 in aligned relation to the outer projecting end of the shaft 49, the full diameter of such plunger being spaced from the adjacent end of the shaft while a reduced diameter extension 58 of the plunger bridges the distance between the plunger and shaft and enters in a longitudinal recess 59 in the end of the shaft.

Arranged to be interposed between the portion of large diameter of the plunger 56 and the adjacent end of shaft 49 is a bulbous member 61 having a slot 62 for passage of the extension 58 therethrough. A link or crank arm 63 extends upwardly from the bulbous member 61 and is pivotally connected as by a pin 60 to an eccentric position on a crank disk 64. Extending axially from the disk 64 is a rod 65 projecting through and having a bearing in an insert member 66 set in the body 10 to close an opening 67 therein. The rod 65 is reduced in diameter and extends through and beyond the insert member 66 to a point outside the body 10. On such outer projecting end is pinned a lever 68. A spring 69 is interposed between the lever 68 and the insert member 66 in a manner to hold the assembly comprising the rod 65 and crank disk 64 in an assembled position. The lever 68 further mounts a plunger and knob combination 71 spring urged in the manner shown in FIG. 3 to engage detent positions 72 in the body 10. According to the construction and arrangement of parts, the lever 68 normally is held in a set position of adjustment by the plunger assembly 71. Upon release of the latter the lever may be rocked to turn rod 65 about its axis whereby partly to rotate the crank disk 64 whereby to raise or to lower the crank arm 63 and bulbous member 61. In an elevated position of the member 61 the connection which is established thereby between the plunger 56 and shaft 59 is made ineffective or disabled with the result that a leftward or extending motion of the plunger 56 resulting from a rising fuel temperature is without effect on the valve shaft 49. The bulbous member 61 is formed with a downwardly extending portion 73 in effect providing fingers on opposite sides of the slot 62. The portion 73, while of insufficient width to bridge the distance between plunger 56 and shaft 49 serves to retain a cooperative relationship between the extension 58 of the plunger and the bulbous member proper so that upon a subsequent descent of the bulbous member it will be guided into a proper position interposed between the plunger 56 and the shaft 49 as shown in FIG. 1.

The lever 68 has alternate positions of adjustment in which the bulbous member 61 is respectively raised and lowered. The lever thus provides an external means of control to make the valve sub-assembly selectively responsive to fuel temperature. Thus, with the lever set to a position interposing the bulbous member 61 to the position of FIG. 1, an extension of the plunger 56, resulting from rising fuel temperatures in the chamber 26, acts through member 61 as a link upon the end of the shaft 49. The resulting axial motion of the shaft serves to move the entire assembly comprising the valve sub-assembly, the thermostat case 47, sleeve 56 and cage 38 leftwardly against the urging of spring 37 which is subordinate in strength to the expansive force of the thermal material in case 59. As this motion continues, the circular valve element 34 seats in and closes opening 16 cutting off further flow of the oil to the heat exchanger. At the same time valve element 32 is moved from its seat and flow is accordingly permitted through the opening 15 to chamber 17 and out of the assembly by way of outlet opening 21.

In the illustrated embodiment of the invention, the selective control represented by the lever 68 provides for two different modes of operation of the valve assembly, depending upon the type of fuel with which the valve is used. Thus, in the event the fuel in use is that subject to quality loss at high temperatures then the lever 68 is set to the position indicated where the bulbous member 61 is interposed for an operation of the shaft 49 by the thermostat plunger 56. Accordingly, when the fuel temperature in chamber 26 approaches a critical high value the plunger 56 begins to extend and as the critical temperature is reached and passed the valve sub-assembly is shifted by the thermostat plunger 56 leftward to discontinue the supply of hot oil to the heat exchanger and to direct it instead to by-passing relation thereto. The source of heat which is the cause of fuel overheating accordingly is removed. If the fuel in use is of a high temperature quality or one not subject to destruction by high temperatures then the lever 68 is set to an alternate position in which the bulbous member 61 is lifted or retracted from an interposed position. Under this condition the extending motion of the plunger 56 is without effect upon the valve sub-assembly, the projecting portion 58 of the plunger merely sliding within the recess 59. The operation of the valve so remains under control of the thermostat unit 18 and the adjustment of the valve elements 34 and 32 continues to be a function only of oil temperature. The operation of the thermostat 24, in the interposed position of the element 61, is in overriding relation to the thermostat unit 18 and accomplishes its valve adjustment irrespective of oil temperature.

Further in accordance with the known operating characteristics of the thermostatic unit 18, the spring 37 thereof provides a pressure relief feature. If flow through and beyond the outlet 25 should for any reason become excessively restricted the pressures in chambers 13 and 22 tend more nearly to equalize while the pressure difference between chambers 13 and 17 increases. The result is to move the entire thermostatic unit 18, and valve sub-assembly, leftward, the motion being absorbed in the spring 37. Full uninterrupted flow may thus continue through the valve body. All or a portion of such flow, however, being now by-passed directly through the body from inlet 14 to outlet 21.

What is claimed is:

1. A thermostatic valve including a body, an inlet to said body for a first fluid, a pair of spaced outlets from said body for said first fluid, valve means settable to alternative positions of adjustment to direct flow from said inlet to one or the other of said outlets, a passage through said body for a second fluid, thermal means responding to the temperature of said first fluid to set said valve means to close off flow of said first fluid to one of said outlets and open flow to the other of said outlets as the temperature of said first fluid reaches a predetermined high level, other thermal means responding to the temperature of said second fluid, a connection between said other thermal means and said valve means to set said valve means to a reverse position to close off flow to said other outlet and to open flow to said one outlet as the temperature of said second fluid reaches a predetermined high level irrespective of the temperature of said first fluid, and interposed means in said connection adjustable to render said other thermal means alternatively effective and ineffective to move said valve means.

2. A thermostatic valve, including a body, an inlet chamber in said body receiving a first fluid, said body providing oppositely disposed outlet openings from said chamber, valve means reciprocable in said body including a shaft and separate valves on said shaft arranged to open one of said outlet openings while closing the other in response to axial motion of said shaft in one direction and to close said one outlet opening while opening the other in response to axial motion of said shaft in the opposite direction, means responding to the temperature of said first fluid to effect axial motion of said shaft, a passage through said body for a second fluid, other means responding to a rising temperature of said second fluid to effect axial motion of said shaft in a selected axial direction irrespective of the temperature of said first fluid as said second fluid reaches a predetermined high temperature value, a removable connection between said other means and said shaft, and means accessible from outside said body for selectively interposing and removing said connection to make movement of said valve means selectively responsive to the temperature of said second fluid.

3. A thermostatic valve according to claim 2, characterized in that said last named means includes a manipulative control outside said body, crank means in said body turned by said control, and a link interconnecting said crank and said connection.

References Cited in the file of this patent
UNITED STATES PATENTS

| | | |
|---|---|---|
| 221,978 | Sanderson | Nov. 25, 1879 |
| 2,701,102 | Albrecht | Feb. 1, 1955 |
| 2,788,176 | Andersen | Apr. 9, 1957 |

FOREIGN PATENTS

| | | |
|---|---|---|
| 421,938 | Great Britain | Jan. 2, 1935 |